United States Patent Office 3,338,984
Patented Aug. 29, 1967

3,338,984
PROCESS FOR THE PRODUCTION OF
ACETYLENE
David P. Keckler, Lakewood, Ohio, and Ronald W. Pokluda, Houston, Tex., assignors to Diamond Alkali Company, Cleveland, Ohio, a corporation of Delaware
No Drawing. Filed Dec. 4, 1964, Ser. No. 416,120
9 Claims. (Cl. 260—679)

This invention relates to the production of acetylene, and more particularly to a method for improving the efficiency of quenching and heat exchange operations in the preparation of acetylene by partial oxidation of aliphatic hydrocarbons and its recovery and purification.

Acetylene may be prepared from lower aliphatic hydrocarbons, such as methane or natural gas, by mixing the preheated hydrocarbon gas and oxygen, the latter being present in an amount less than that required for complete combustion of the hydrocarbon, in a mixing chamber and conducting the gaseous mixture from the mixing chamber to a flame reaction chamber wherein partial combustion takes place. A series of separation and purification steps is then required for the recovery of acetylene and the disposal of unwanted by-products. In a preferred procedure, the gas stream issuing from the flame reaction chamber (hereinafter referred to as the "raw gas stream") is contacted initially with enough water to arrest the reaction by cooling the gas below its combustion point. Due to the high temperature of the raw gas mixture, the water is ordinarily vaporized and passes within the raw gas stream into subsequent steps of the process.

The gas stream issuing from this "burner quench" is still at a high temperature, typically about 225–275° F. For further cooling, it is ordinarily passed to a so-called "primary quench" column wherein it is contacted with a cooling liquid such as water, the cooling liquid being present in sufficient quantity to absorb most of the heat of the raw gas stream. The primary quench also serves the purpose of removing from the raw gas stream a large portion of the impurities therein, including solid materials (primarily soot) and high molecular weight semi-solid materials such as tars. The heat absorbed by the primary quench liquid is preferably recovered in later stages of the process, such as reboilers, heat exchangers and the like.

The raw gas stream leaving the primary quench column is normally at a temperature somewhat below 225° F., typically about 210–215° F. It is further cooled in a "secondary quench" column by contact with further cooling liquid which lowers its temperature to substantially below 100° F., at the same time removing additional quantities of soot and tars.

The tarry and solid impurities in the quench water foul the process equipment by adhering strongly thereto. This problem is particularly acute in the case of the primary quench liquid, since this liquid is circulated through equipment other than the quench apparatus itself. Thus, the fouling problem is carried beyond the actual extent of the equipment involved in the quench operation. Often, this equipment is so encrusted with tars and solid impurities that it must be shut down and completely cleaned at intervals of one month or less. Moreover, heat transfer is impaired by the tarry coating on the equipment.

A principal object of the present invention, therefore, is to prevent fouling of equipment through which the quench liquids pass.

Another object is to provide a method for the avoidance of frequent plant shutdowns for the purpose of cleaning the quench columns and other equipment.

Still another object is to increase the efficiency of heat transfer in the acetylene separation system.

Other objects will in part be obvious and will in part appear hereinafter.

According to this invention, the above-described difficulties are overcome by adding certain substances to the primary and secondary quench water. The additive for the primary quench comprises (1) about 25–100 p.p.m. of a polyoxyalkylene amine defoaming agent, (2) about 10–30 p.p.m. of a sodium alkarylsulfonate wetting agent, and (3) about 2–10 p.p.m. of a dispersant selected from the group consisting of cellulose alkyl and hydroxyalkyl ethers. The additive for the secondary quench comprises about 5–20 p.p.m. of the dispersant (cellulose alkyl or hydroxyalkyl ether).

The wetting agent which is added to the primary quench water according to the method of this invention is a sodium alkarylsulfonate, preferably containing an alkyl chain of 12–16 carbon atoms attached to a benzene ring and having a molecular weight of about 400–450. Certain other wetting agents may be used but are less effective. The concentration of the wetting agent is about 10–30 p.p.m. and preferably 10–20 p.p.m., based on the weight of the water. Its function is to promote the suspension of the tars and soot in the aqueous medium, thus preventing their deposition on the walls of the equipment.

The choice of wetting agent is partly determined by the properties of the quench solution after the addition of said wetting agent. A number of wetting agents create a foam problem. Sodium alkarylsulfonates also cause foaming, but the extent thereof is somewhat less pronounced than with other anionic wetting agents. However, it has been found advantageous to add a defoamer along with the wetting agent. This defoamer is preferably a compound formed by reacting an aliphatic amine with an alkylene oxide to form a polyglycol amine of relatively high molecular weight. The defoamer is added in amounts of about 25–100 p.p.m., and preferably about 60 p.p.m.

The dispersing agent is normally a derivative of cellulose wherein about 27–31% of the cellulose hydroxy groups are substituted with lower alkyl radicals, and the remaining hydroxy groups may be substituted by hydroxyalkyl radicals, e.g., by reaction of the alkylated cellulose with an alkylene oxide. Preferred dispersants are methyl and mixed methyl and hydroxypropyl ethers of cellulose. The effect of the dispersant in the quench medium is to break up agglomerates of soot into smaller particles which are then maintained in suspension through the action of the wetting agent. The concentration of dispersant is about 2–10 p.p.m., preferably about 4–8 p.p.m.

It is not necessary to use this combination of ingredients in the secondary quench medium; indeed, certain of said ingredients have a detrimental effect if employed in the secondary quench. Dispersion of the impurities is, however, promoted by the addition of about 5–20 p.p.m. of the above-identified dispersant.

In a typical mode of operation according to the present invention, a mixture of natural gas and oxygen is passed through a reactor wherein the gases are ignited. The ignited gases reach a temperature which may be substantially in excess of 2000° C. They are then contacted with water in the "burner quench" and cooled sufficiently to arrest the thermal cracking reaction. Most of the burner quench water is vaporized and passes with the raw gas stream into the primary quench column. The temperature of the gases entering this column is usually about 250–270° F.

The raw gas stream passes upward through the primary quench column which preferably consists of a countercurrent contact tower of several plates. Meanwhile, water containing the additive ingredients specified hereinabove is passed downward through the column and removes impurities such as high molecular weight acetylenes, tar, naphthalene and other aromatics, indene and analogous compounds and soot from the raw gas stream, at the same time absorbing heat from the gases. The soot and tars are kept in suspension in the quench water by the additives dissolved therein. The water is then preferably passed to other apparatus downstream wherein heat is required, such as methanol reboilers and the like, where it discharges the absorbed heat and is thereafter recycled to the primary quench.

The gas stream leaves the primary quench column at a temperature of about 190–220° F. and passes to the secondary quench column. The secondary quench water is preferably chilled to below room temperature and contains the dispersant described hereinabove. The gas stream, cooled to below 100° F., then passes to a series of solvent extraction and wash steps wherein the acetylene is recovered and the remaining impurities are removed and disposed of.

When operated without the additives of this invention, the primary quench system has required shutdown for cleaning after two to four weeks of operation. Moreover, the heat exchangers wherein the heat recovered in the primary quench column is used became badly fouled so that only a small portion of the available heat could be recovered; in particular, a 60% decrease in heat transfer coefficient was noted in one of the heat exchangers over a 28-day period. After the addition of the wetting agent-dispersant-defoamer combination to the quench water according to this invention, the system has been in operation for fourteen months without fouling and without substantial decrease in heat transfer coefficient in the exchangers.

Similarly, whereas the secondary quench system has had to be removed and cleaned about every three weeks when operated without disperant, continuous operation with substantially no fouling over twelve months or more is noted when a dispersant is added according to this invention.

Thus, it will be appreciated that the method of the present invention affords notable improvements in the operation of the acetylene production system.

It is to be understood that the invention is not limited by the specific examples and embodiments described hereinabove, but includes such changes and modifications as may be apparent to one skilled in the art upon reading the appended claims.

What is claimed is:

1. In a method for the production of acetylene which comprises the steps of (A) pyrolyzing saturated hydrocarbons in a flame reaction, in the presence of a quantity of oxygen less than that required for complete combustion of said hydrocarbons; (B) arresting the pyrolysis reaction by cooling the pyrolyzed gases with a quenching liquid; passing the raw gas stream thus formed to (C) a primary quench wherein it is contacted with water for the removal of tars and solid impurities and absorption of heat from said gas, and thence to (D) a final quench wherein it is contacted with water for the further removal of tars and solid impurities;

the improvement which comprises adding to the primary quench water (1) about 25–100 p.p.m. of a high molecular weight polyoxyalkylene amine defoaming agent, (2) about 10–30 p.p.m. of a sodium alkarylsulfonate wetting agent, and (3) about 2–10 p.p.m. of a dispersant selected from the group consisting of alkyl ethers of cellulose and alkyl hydroxyalkyl ethers of cellulose; and adding to the final quench water about 5–20 p.p.m. of said dispersant.

2. In a method for the production of acetylene which comprises the steps of (A) pyrolyzing saturated hydrocarbons in a flame reaction, in the presence of a quantity of oxygen less than that required for complete combustion of said hydrocarbons; (B) arresting the pyrolysis reaction by cooling the pyrolyzed gases with a quenching liquid; passing the raw gas stream thus formed to (C) a primary quench wherein it is contacted with water for the removal of tars and solid impurities and absorption of heat from said gas, and thence to (D) a secondary quench wherein it is contacted with water for the further removal of tars and solid impurities;

the improvement which comprises adding to the primary quench water (1) about 25–100 p.p.m. of a high molecular weight polyoxyalkylene amine defoaming agent, (2) about 10–30 p.p.m. of a sodium alkarylsulfonate wetting agent, and (3) about 1–10 p.p.m. of a dispersant selected from the group consisting of alkyl ethers of cellulose and hydroxyalkyl ethers of cellulose.

3. The method of claim 2 wherein the concentration of the defoaming agent is about 60 p.p.m., that of the wetting agent is about 10–20 p.p.m. and that of the dispersant is about 4–8 p.p.m.

4. The method of claim 2 wherein the wetting agent is a sodium alkylbenzenesulfonate containing an alkyl chain of 12–16 carbon atoms attached to the benzene ring and having a molecular weight of about 400–450.

5. The method of claim 2 wherein the dispersing agent is a cellulose methyl ether wherein about 27–31% of the cellulose hydroxy groups are substituted with methyl groups.

6. The method of claim 2 wherein the dispersing agent is a cellulose methyl hydroxypropyl ether wherein about 27–31% of the cellulose hydroxy groups are substituted with methyl radicals and the remainder of said hydroxy groups are substituted with hydroxypropyl radicals.

7. In a method for the production of acetylene which comprises the steps of (A) pyrolyzing saturated hydrocarbons in a flame reaction, in the presence of a quantity of oxygen less than that required for complete combustion of said hydrocarbons; (B) arresting the pyrolysis reaction by cooling the pyrolyzed gases with a quenching liquid; passing the raw gas stream thus formed to (C) a primary quench wherein it is contacted with water for the removal of tars and solid impurities and absorption of heat from said gas, and thence to (D) a secondary quench wherein it is contacted with water for the further removal of tars and solid impurities;

the improvement which comprises adding to the secondary quench water about 5–20 p.p.m of a dispersant selected from the group consisting of alkyl ethers of cellulose and mixed alkyl and hydroxyalkyl ethers of cellulose.

8. The method of claim 7 wherein the dispersant is a methyl ether of cellulose wherein about 27–31% of the cellulose hydroxy groups are substituted with methyl radicals.

9. The method of claim 7 wherein the dispersant is a cellulose methyl hydroxypropyl ether wherein about 27–31% of the cellulose hydroxy groups are substituted with methyl radicals and the remainder of said hydroxy groups are substituted with hydroxypropyl radicals.

References Cited

UNITED STATES PATENTS

| | | | |
|---|---|---|---|
| 2,373,951 | 4/1945 | Evans et al. | 260—679 |
| 2,585,659 | 3/1952 | Kelpatrick | 260—679 |
| 2,746,564 | 5/1956 | Williams | 260—679 |
| 2,980,522 | 4/1961 | Dille et al. | 260—679 |

DELBERT E. GANTZ, *Primary Examiner.*

J. MYERS, *Assistant Examiner.*